UNITED STATES PATENT OFFICE.

HENRY C. TODD, OF OAK PARK, AND CHARLES MAYR, OF CHICAGO, ILLINOIS, ASSIGNORS TO CHICAGO FIREPROOF COVERING CO., A CORPORATION OF ILLINOIS.

VITRIFIED CEMENT PRODUCT AND PROCESS OF MAKING SAME.

935,616.     Specification of Letters Patent.     Patented Sept. 28, 1909.

No Drawing.     Application filed May 21, 1907. Serial No. 374,952.

*To all whom it may concern:*

Be it known that we, HENRY C. TODD and CHARLES MAYR, citizens of the United States of America, and residents of Oak Park, county of Cook, State of Illinois, and Chicago, county of Cook, State of Illinois, respectively, have invented certain new and useful Improvements in Vitrified Cement Products and Processes of Making Same, of which the following is a specification.

Our invention relates to cements of the kind usually called hydraulic cements, and comprises a new process and product resulting from the treating of such cements, after setting, with a solution of colloid soluble silicate.

Cements of the class referred to including Portland and Roman cement, and varieties known by other names, have the quality of combining with water to set and harden. This "setting" takes place in a comparatively short space of time, but the hardening process continues progressively for weeks or months and perhaps years. We have discovered that by our method of treatment, we can accelerate the ordinary hardening process and push it to a greater degree, carrying it in a short time to the point of substantial vitrification.

While our process gives good results with pure cement or with ordinary mixtures of cement and sand or other substances commonly used, we find the best effects are secured by making the original mixture more porous by adding to the cement short fibers of asbestos, infusorial earth, magnesia, powdered pumice stone or other porous powders. Taking for example Portland cement, sand and asbestos, we mix the same in any convenient mixing apparatus in varying proportions according to the purpose for which the completed article is designed. The limiting proportions by weight might be given approximately as follows: Portland cement, 30 to 60 lbs.; asbestos fiber, 5 to 20 lbs.; sand or mineral filler, 20 to 60 lbs.; water, 25 to 42 lbs. This mixture may be molded, pressed, cast, or otherwise formed into a body of the desired shape and thoroughly dried. This drying may be done artificially in any convenient form of drying oven. The article thus formed and dried is next dipped in a solution of colloid soluble silicates which we call the "vitrifying" solution. This vitrifying solution may be made up in a number of ways. The best solution so far known to us is a dialyzed silicate of potash made from one gallon of 40 per cent. silicate of potash in solution and three gallons of water. The dialyzing of this solution is performed in the usual and well known way. Colloidal silica, whether obtained by dialyzation or colloidation, is equally effective when used in these solutions. Other solutions which we find will serve are solutions of hydrate of silica obtained by dialysis; a weak silicate of ammonia in solution obtained by treating hydrous silica ($SiO_2$) with ammonia ($NH_3$) and water; or a dialyzed mixture of one part by weight silicate of soda in solution and three parts water.

We take the article formed of cement or of a cement composition as above described after the same is "set" and dried, and dip it one or more times in one of the vitrifying solutions of the character last mentioned, the period of such immersion varying according to the thickness of the article, porosity of the cement mixture, degree of vitrification desired and concentration of dialyzed solution. Usually the immersion is continued from 10 to 12 hours, though in extreme cases 48 hours may be required. The dipped article is then allowed to dry or is treated in drying ovens and the result is such a marked increase in strength of the specimen that it presents from eight to ten times the resistance to crushing forces which it possessed before treatment. Thus a cement block which has a crushing strength of ten tons per square foot of cross section, presents after our treatment, a resistance to crushing of from eighty to one hundred tons.

This process has perhaps its most important application in the case of the treatment of relatively thin slabs, or plates formed of cement and cement compositions, as it gives them great strength and toughness and a perfectly waterproof quality.

So far as our investigations have gone we are led to believe that the above stated results are due to the fact that after the hydraulic cement is well set and dried, the introduction of the solution of colloid soluble silicates into and through the pores of the mass causes a molecular combination of the silicate of the alkali in solution, with the silico-aluminates of the cement, into the form of larger hydrated molecules, which molecular combination has greater hardness than ordinary cement and completes its hardening process in a much shorter time than is required for the natural hardening process of cement and ordinary cement compositions.

Each and all of the above described vitrifying solutions introduce into the molecularly united mass of "set" cement, elements which cause the product to more nearly resemble glass in its chemical analysis. Hence the terms "vitrifying" and "vitrification" are believed to be chemically correct when applied to the solutions and to the process herein described. Analyses of the average Portland cements show that they differ from the ordinary calcareous glass mainly in the fact that the cement has less silica and less free alkalies than does the glass. This deficiency in the cement is partly supplied by the treatment with the vitrifying solution as appears by the following analyses:

|  | Cements. | Glass. | Cement after treatment. |
|---|---|---|---|
| Lime CaO | 52% | 36% | 44% |
| Magnesia MgO | 6% | 3% | 5% |
| Iron sesqui oxid $Fe_2O_3$ | 4% | 5% | 3% |
| Alumina | 9% | 7% | 8% |
| Silica | 27% | 39% | 35% |
| Alkalies and traces | 2% | 10% | 5% |
|  | 100 | 100 | 100 |

With these chemical changes toward the condition of glass comes the increased hardness and powers of resistance possessed by glass and the process described is believed to be a true hydrated "vitrification."

The treatment with the vitrifying solution may be by spraying, swabbing or pouring instead of immersing, or by any other process which will produce a suitable impregnation of the set cement with the solution.

Having, therefore, described our invention, we claim:

1. The herein described process of producing articles of great hardness which comprises the following steps: first, mixing hydraulic cement and water; second, shaping the same into the required form and allowing it to set; third, drying the article so made; fourth, impregnating same with a solution of a colloid soluble silicate.

2. The herein described process of producing articles of great hardness which comprises the following steps: first, mixing hydraulic cement and water with a powdered porous material; second, shaping the same into the required form and allowing it to set; third, drying the article so made; fourth, impregnating same with a solution of a colloid soluble silicate.

3. The herein described process of producing articles of great hardness which comprises the following steps: first, mixing hydraulic cement and water with another material as a filler; second, shaping the same into the required form and allowing it to set; third, drying the article so made; fourth, impregnating same with a solution of a colloid soluble silicate.

4. The herein described process of producing articles of great hardness which comprises the following steps: first, mixing hydraulic cement, asbestos fiber and water; second, shaping the mass into the required form and allowing it to set; third, drying the mass; fourth, dipping the same in a solution of a colloid soluble silicate and drying.

5. The herein described process of producing articles of great hardness which comprises the following steps: first, mixing hydraulic cement, asbestos fiber and water; second, shaping the mass into the required form and allowing it to set; third, drying the mass; fourth, dipping the same in a solution of a dialyzed colloid soluble silicate and drying.

6. As an article of manufacture, a body of set hydraulic cement and colloidal soluble silica, the latter existing as an impregnating material for the cement.

7. As a new article of manufacture, a body of set hydraulic cement containing hydrated molecules of silico aluminates of alkalies and an alkaline earth in double combination.

Signed at Chicago, Ill., this 18th day of May 1907.

HENRY C. TODD.
CHARLES MAYR.

Witnesses:
F. G. SIMPSON,
T. G. YOUNGLOVE.